United States Patent
Valdy

(10) Patent No.: US 7,909,537 B2
(45) Date of Patent: Mar. 22, 2011

(54) DEEP-SEA NETWORK AND DEPLOYMENT DEVICE

(75) Inventor: Pierre Valdy, Toulon (FR)

(73) Assignee: Institut Francais de Recherche pour l'Exploitation de la Mer (IFREMER), Issy-les-Moulineaux (FR)

(*) Notice: Subject to any disclaimer, the term of this patent is extended or adjusted under 35 U.S.C. 154(b) by 0 days.

(21) Appl. No.: 12/373,025

(22) PCT Filed: Jul. 6, 2007

(86) PCT No.: PCT/FR2007/001151
§ 371 (c)(1),
(2), (4) Date: Jan. 8, 2009

(87) PCT Pub. No.: WO2008/006964
PCT Pub. Date: Jan. 17, 2008

(65) Prior Publication Data
US 2010/0008730 A1    Jan. 14, 2010

(30) Foreign Application Priority Data
Jul. 10, 2006 (FR) .................................. 06 06292

(51) Int. Cl.
*H02G 9/02* (2006.01)
(52) U.S. Cl. ......... 405/165; 405/164; 405/169; 405/170
(58) Field of Classification Search .................. 405/158, 405/159, 164, 165, 166, 169, 170
See application file for complete search history.

(56) References Cited

U.S. PATENT DOCUMENTS

| | | | | |
|---|---|---|---|---|
| 4,486,861 A * | 12/1984 | Harmel | ......................... | 405/166 |
| 4,542,334 A * | 9/1985 | Nelson | ........................... | 405/161 |
| 4,892,443 A * | 1/1990 | Kunze et al. | .................. | 405/164 |
| 5,722,793 A * | 3/1998 | Peterson | ....................... | 405/164 |
| 5,724,241 A * | 3/1998 | Wood et al. | ..................... | 702/14 |
| 5,971,665 A * | 10/1999 | Hughes | ........................... | 405/159 |
| 6,474,254 B1 * | 11/2002 | Ambs et al. | .................... | 405/167 |
| 6,588,980 B2 * | 7/2003 | Worman et al. | ............... | 405/158 |
| 6,776,559 B1 * | 8/2004 | Peterson | ....................... | 405/158 |
| 6,846,133 B2 * | 1/2005 | Naes et al. | ..................... | 405/160 |
| 7,025,534 B2 * | 4/2006 | Martin et al. | ................. | 405/159 |
| 7,066,687 B2 * | 6/2006 | Martin et al. | ................. | 405/160 |
| 2002/0172562 A1 * | 11/2002 | Worman et al. | ............... | 405/161 |

FOREIGN PATENT DOCUMENTS
GB    2 384 313    7/2003

OTHER PUBLICATIONS

Kawaguchi et al., "An expandable deep seafloor monitoring system for earthquake and tsunami observation network," *Oceans 2000 MTS/IEEE Conference and Exhibition*, Sep. 11-14, Piscataway NJ (2000).

* cited by examiner

*Primary Examiner* — Frederick L Lagman
(74) *Attorney, Agent, or Firm* — Patterson Thuente Christensen Pedersen, P.A.

(57) ABSTRACT

Existing underwater networks are formed using telecommunications cable technology designed for intercontinental links. The network is formed by a continuous series of transport segments that are connected in the factory by repeaters or bypasses and deployed continuously from the surface by a cable ship.

19 Claims, 5 Drawing Sheets

DEEP-SEA NETWORK AND DEPLOYMENT DEVICE

RELATED APPLICATIONS

This application is a national stage entry from PCT Application No. PCT/FR2007/001151 filed Jul. 6, 2007, which claims priority to French Application No. 0606292 filed Jul. 10, 2006, the disclosures of which are hereby incorporated by reference in their entireties.

A deep-sea network independent transport segments. The transport segments are produced using spools of optical micro-cables which are provided with end connectors, said spools being borne by a deployment device that is operated on the sea floor by an underwater vehicle. The nodes of the network take the form of self-powered switches to which the ends of the transport segments and the local sensors are connected on the sea-floor. The network can be used for the production of economical deep sea networks that can be easily extended for the interconnection of deep-sea surveillance sensors.

TECHNICAL FIELD

The present invention relates to a novel deep-sea network and its deployment device. The invention is primarily intended for the production of cost-effective and easily extendable networks for the interconnection of deep-sea surveillance sensors.

BACKGROUND ART

Conventional deep-sea telecommunication cables are designed to interconnect ground user networks within high-speed paying intercontinental links. These electro-optical cables are highly reliable and have a lifetime of many decades. They are deployed conventionally from the surface by cable ships. They must be particularly reinforced as they must be resistant to deployment efforts due to their linear weight and surface accelerations. Links of a few hundred kilometers are produced in one piece in a factory by assembling cable segments by using repeaters (about every fifty kilometers) as well as bypasses for communicating with other ground user networks (an island for example).

This technology perfectly meets the needs of ground users but is not necessarily adapted to users requiring to be connected on the sea floor. However, the deep-sea sensor networks which are currently under study are either adopting or planning to adopt this technology, mainly for availability and reliability purposes.

According to this technology, in a first phase, the network is deployed continuously from the shore by a cable ship, from point-of-use to point-of-use. The network is formed by transport segments connected in a factory by repeaters or bypasses in order to serve the various points-of-use. In a second phase, nodes (or junction boxes) are set-up and connected at the ends of these bypasses on the sea floor by an underwater vehicle. In a third phase, these sensors are set-up and connected on the sea-floor by an underwater vehicle.

The advantage of this concept is to use for the network, cables and deployment methods that are proven in the telecommunications field. Another advantage is that these electro-optical cables designed to supply repeaters in line can also electrically supply the sensors. Such cables can transmit at high voltage, power levels of around hundreds of kilowatts.

The disadvantage is that these cables are heavy (a ton per kilometer) and are costly. Moreover, their deployment requires specialized and costly cable ships.

However, despite the existence of other communication concepts, there is no way to avoid the (optical) cable for sea floor communications over a great distance. The acoustic transmission concept is not adapted for great distances and requires the use of relay stations every ten kilometers. Moreover, the bandwidth is very limited and the energy per transmitted bit is high. The Hertzian transmission concept by means of surface buoys requires maintenance and the seafloor-surface link is fragile. In addition, these buoys are dangerous with regard to navigation.

The novel deep-sea cabled network scope of the invention stems from the following observations:

The first observation is that a deep-sea cable does not need to be particularly protected. The problems faced on the telecommunication cables in use happen mostly near the coast and at shallow depths. They are the result of anchoring activities of ships, fishing activities and fish bites. That is why in these landfall areas, the telecommunication cables are protected by external armor. Their weight is about ten tons per kilometer and their tensile resistance can reach a hundred tons. In addition, in order to perfect their protection they are usually trenched at the bottom of a trench. In deep sea (beyond 1500 metres), due to the low risk level, the cables do not need to be protected and besides, do not comprise external protection other than their plastic insulation. However, these cables remain heavy and resistant due to their deployment method from the surface (heavy to be laid at high speed and resistant to be laid at great depths).

The second observation is that low-power electronics associated with high-performance batteries enable the supply of sensors for many years. Microprocessors on standby associated with low-power clocks allow for the sampling of the measurements and the transmission of data regularly with minimum energy use. Such Hertzian transmission networks exist ashore. Weather sensor acquisition stations are a standard illustration of this type of electronics. They allow for the saving and transmission of data for many years from the energy contained in a very small battery.

The conclusion resulting from the observations established above is the following:

If the network of sensors is of a stand-alone type, the cable does not need its electric conductor anymore. If the cable is deployed close to the sea floor, it does not need to be heavy and resistant. And if the length of the network's transport segments is less than one hundred kilometers (which corresponds to the need with regard to the average distance between the points-of-use), such a micro-cable can thus be carried, deployed and connected from node to node by an underwater vehicle. Thus, the scientific users can set up, complete and maintain their own sensor networks from the scientific means they dispose of (namely, the oceanographic ships carrying underwater vehicles) without the need for costly cable ships that are in short supply. Thus, the sensors are deployed and connected during the actual set-up of the network with the same means.

A micro-cable comprising one or two optical fibres as well as an external longitudinal reinforcement has a diameter of about two millimeters and can resist a tension of about a hundred kilograms. Such a micro-cable is a hundred times lighter and ten times cheaper than a conventional telecommunications cable. The volume and weight of a transport segment is such that it can be deployed directly on the sea floor by an underwater vehicle.

The present invention is a deep-sea network having independent transport segments and made by means of optical micro-cable spools directly unwound on the sea floor by an underwater vehicle. The nodes of the network are stand-alone switches (that is, energy-autonomous type switches) whereon the ends of the transport segments and local sensors are connected on the sea floor.

The scope of the present invention is a method of producing a deep-sea network comprising main and secondary transport segments, nodes arranged on the points-of-use and local sensors characterised in that:
- the transport segments are unwound independently by means of optical micro-cable spools which are provided with end connectors and borne by a deployment device implemented on the sea floor by an underwater vehicle,
- the transport segment ends and the local sensors are connected at the sea floor, by an underwater vehicle, to the nodes which are stand-alone switches, so that each micro-cable is connected by its end connectors to two successive nodes of the network.

The present invention also relates to a deep-sea network that can be obtained by the method previously described, comprising main and secondary transport segments, nodes arranged on the points-of-use and local sensors, wherein the transport segments are independent and are each formed by an optical micro-cable provided with end connectors, the nodes are stand-alone switches whereon the ends of the transport segments and the local sensors are connected on the sea floor, each micro-cable being connected by its end connectors to two successive nodes of the network.

Each transport segment is advantageously formed by a micro-cable of a diameter equal to or less than 5 mm, preferably equal to or less than 3 mm, for example about 2 mm.

The present invention also relates to a deployment device for the implementation, of the method described previously, wherein it comprises a frame, a micro-cable rotary spool fixed on this frame and of the node fixed on the rotary spool.

BRIEF DESCRIPTION OF THE DRAWINGS

The deep-sea network and its deployment device are described in more detail with reference to the accompanying drawings.

DETAILED DESCRIPTION OF THE DRAWINGS

Figure 1:
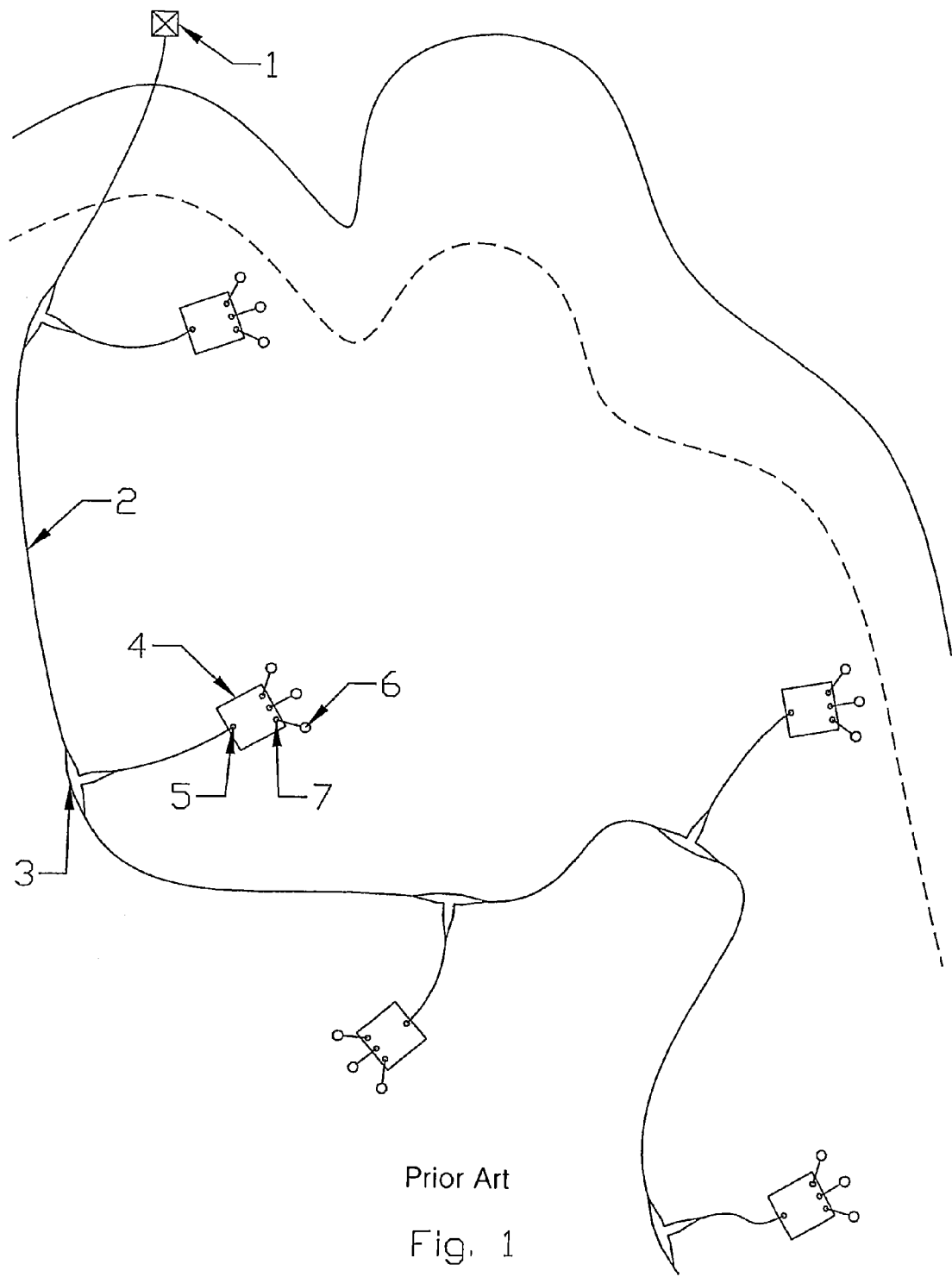
FIG. 1 depicts an overall view of a network developed from the conventional telecommunication cables technology.

FIG. 1 depicts an overall view of a network developed from conventional communication cables technology.

The network is formed from the ground station (1) by a continuous series of transport segments (2) connected ex works by repeaters or bypasses (3) for serving the various points-of-use. In a first set-up phase, the network is deployed continuously from point-of-use to point-of-use from the surface by a cable ship.

Junction boxes (4) are connected to the end of these bypasses (3). Their connection (5) is done either at the surface, or on the sea floors according to the technology used for the connector (waterproof connector suitable for dry plugging in at the surface or waterproof connector suitable for plugging in underwater on the sea floor). In both cases, the length of the bypasses (3) is equal to about one and a half times the water depth of the point-of-use in order to be able to recover the end at the surface and for dry connecting or intervening on the underwater plug-in connector for repair purposes, and thus, without disrupting the rest of the network. The set-up of these junction boxes is carried out in a second phase.

The sensors (6) are connected at the sea floor by means of underwater plug-in connectors (7). The set-up and connection of these sensors is carried out in a third phase by means of an underwater vehicle.

Switches are integrated in the junction boxes (4) and, if the transport segment (2) lengths between the points-of-use allows for it, there are no other repeaters in line. The switches and sensors are supplied in energy by the ground station through the electro-optical cable of the transport segments.

The main characteristic of this architecture is that the transport segments are deployed in one piece. This is evidence of reliability, but the bypasses and, especially, their connection on the junction boxes constitute weak points. The repair and modification of such networks necessitates cutting, recovering and assembling new segments. This can only be achieved through cable ships.

Figure 2:
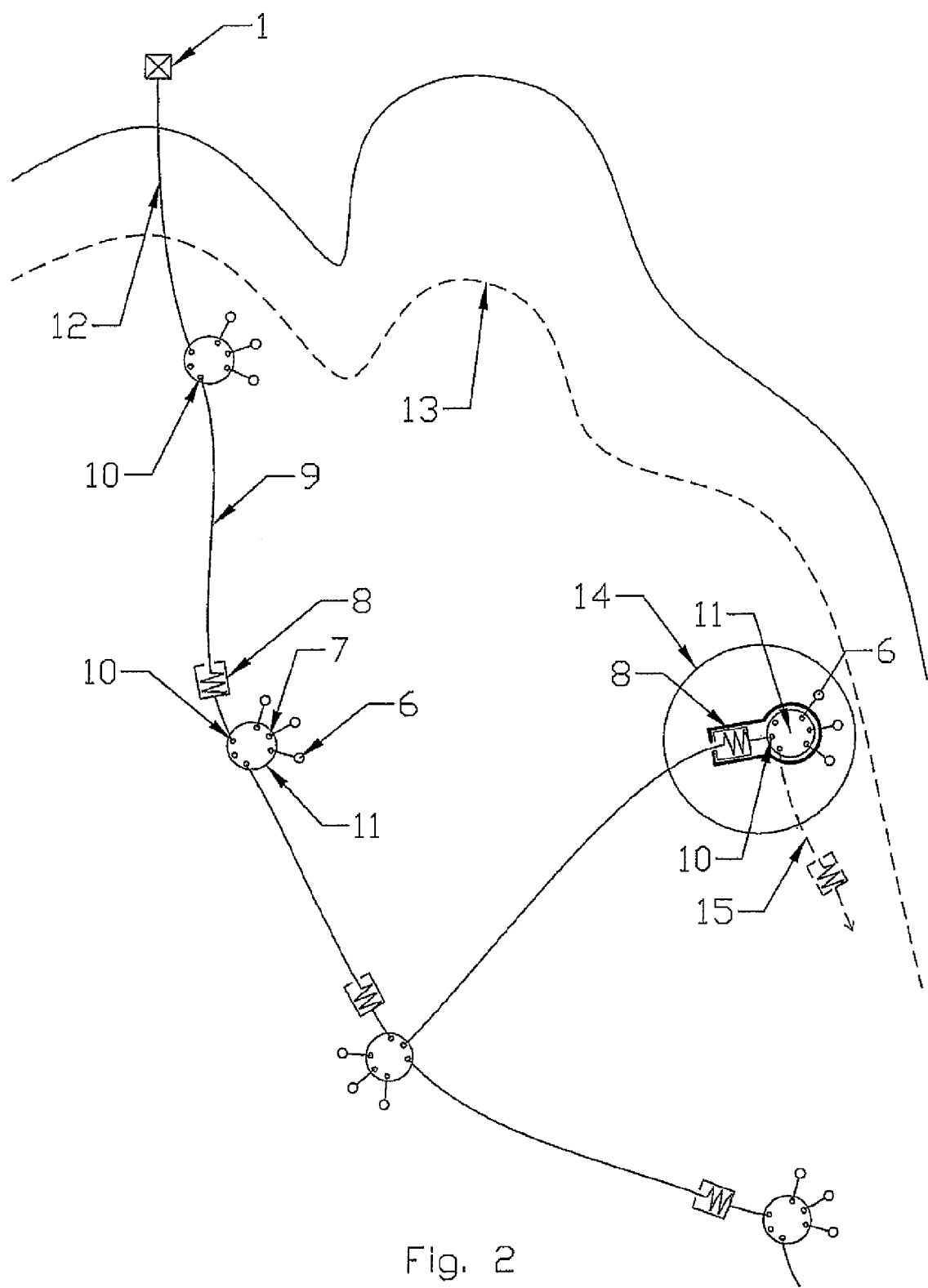
FIG. 2 depicts an overall view of the novel deep-sea network.

FIG. 2 depicts an overall view of the novel deep-sea network.

The deep-sea network of the present invention comprises main and secondary transport segments and nodes arranged on the points-of-use as well as local sensors. It is characterised in that:
- the transport segments are independent and produced by means of spools (8) of optical micro-cables (9) which are provided with end connectors (10) and borne by a deployment device that is implemented on the sea floor by an underwater vehicle,
- the nodes (11) are stand-alone switches whereon the ends (10) of the transport segments and the local sensors (6) are connected at the sea floor.

Preferably, due to risks faced in shallow depths, the segment (12) deployed between the ground station (1) and the deep-sea isobath (13) (for example 1500 metres) is a conventional telecommunications cable.

Preferably, the deployment device (14) implemented on the sea-floor by the underwater vehicle, bears both the spool (8) of micro-cable and the node (11) already connected on one of the end connectors (10). This arrangement makes it possible to check, while deploying the segment, that the node (11) communicates effectively with the ground station (1) through the already-deployed segments.

Preferably, the deployment device (14) bearing at the same time the spool (8) and the connected node (11) is left over on the point-of-use. This prevents risky handling when clearing the cable, the spool and the node for recovering the deployment device. The deployment device (14) thus, serves as a structure whereon the underwater vehicle can dock in order to proceed with the connecting and disconnecting operations of the local sensors (6) in the best conditions. New secondary transport segments (15) can also be connected in order to extend the network.

The maximum reasonable length considered for each segment is about fifty kilometers. The weight of the micro-cable used in the air is about 500 kilograms and the maximum allowable tension during its deployment is about 50 kilograms. Due to its large inertia, a single rotary spool without a tension regulating device is presumably difficult to achieve. An internally unwinding (torpedo-type or missile-type) or an externally unwinding (fishing reel-type) rotationally locked spool makes it possible to overcome these inertia problems. Thus, it is the first embodiment claimed.

This type of production requires winding the cable by twisting one turn at a time by means of specific machines. Thus, the cable loses this twist during the deployment, limiting the risks of kink-formation.

However, deep-sea optical cables are subjected to the sea floor pressure and the polymers usually used for protecting the fiber in ground applications, do not, in the current state of knowledge, guarantee the maintenance of the attenuation characteristics of the fiber in the long term.

This is why the optical fibres of the telecommunication cables are usually protected in micro-tubes (made of steel) which insulate them from the surrounding water pressure. Such an arrangement makes the cables relatively rigid to twisting, thus making their deployment from a fixed spool more difficult.

The rotary spool makes it possible to solve this problem provided that a tension regulating device for solving the problems related to its large rotation inertia is afforded. Thus, this is the second embodiment claimed and detailed later.

Figure 3:
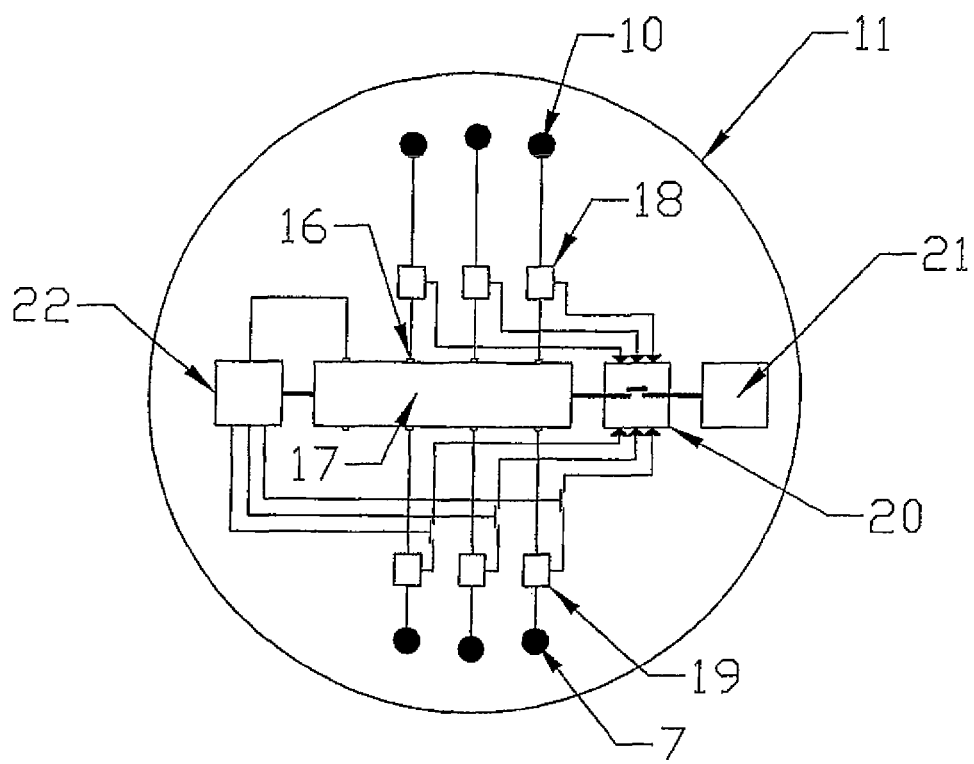
FIG. 3 depicts a wiring diagram of the node.

FIG. 3 represents the node's wiring diagram.

Due to the high cost of sea operations, the network should be able to operate for about ten years, without intervention and completely in a stand-alone fashion. However, the consumption of the current switches is such that they cannot be reasonably supplied round-the-clock by conventional energy sources in the long term. In order to better manage the available energy, one of the network characteristics is that each node (11) is provided with a low-power standby circuit with a timer which can wake the network up from node to node upon request from the ground station (1) or one of the local sensors (6). The timer automatically puts each node on standby after wake-up.

Thus, the ground user can regularly wake the network up through the ground station for short periods of time, in order to discharge the data saved by its sensor.

Likewise, the sensor can also exceptionally wake the network up in order to transmit to the ground user data of a registered special event (for example a warning originating from a tsunami detector or seismograph should be immediately transmitted).

The node's (11) detailed wiring diagram in FIG. 3 is as follows:

The node (11) comprises a number of deep-sea optical connectors (10) whereon the main and secondary transport segments are connected and a number of deep-sea electrical (or optical) connectors (7) whereon the local sensors (6) are connected.

These connectors are connected to the switch (17) ports (16) by means of optical transceivers (18) and electrical (or optical) transceivers (19).

The low-power standby circuit (20) is permanently supplied by the energy source (2) (for example Lithium batteries). Its first function is to turn on the switch (17) and the associated monitoring circuit (22) when it detects a signal coming from one of the receivers (18) or (19). Its second function consists of turning off the switch (17) and the associated monitoring circuit (22) when the time measured by the associated timer has elapsed.

Connected to one of the switch ports (16), the monitoring circuit (22) ensures a number of programmable functions when turned on. One of the functions is the ability to cut the detection of the signal from one of the receptors (19). This safety function enables the network supervisor to prevent a faulty or ill-programmed sensor (6) from untimely waking the node and thus the entire network.

Figures 4, 5:
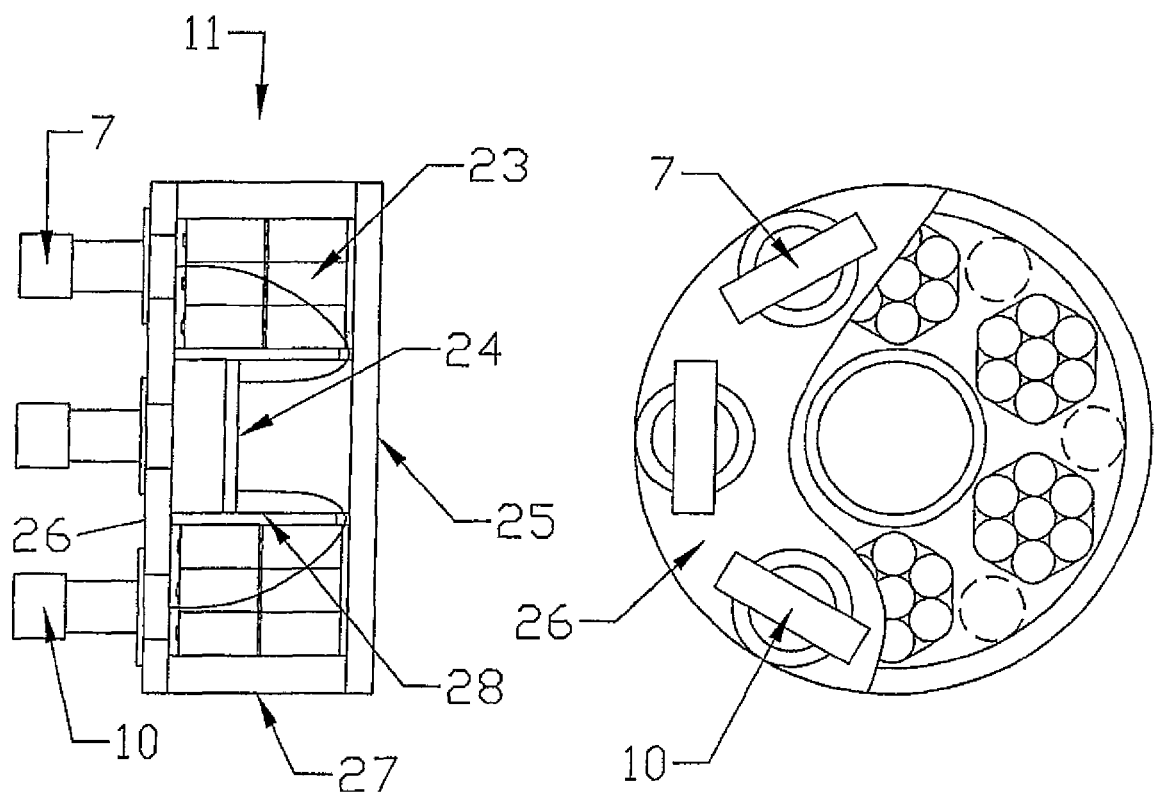
FIG. 4 depicts a cross sectional view of the node across the vertical plane.
FIG. 5 depicts a cross sectional view of the node across the horizontal plane.

FIG. 4 represents a cross sectional view of the node across the vertical plane.

The node (11) comprises a cylindrical enclosure, which is resistant to the external pressure and which incorporates the batteries (23), the electronic circuits (24) as well as the deepwater connectors (7 and 10). One of the main and unusual characteristics of this type of enclosure is that it comprises two lower and upper large-diameter end plates (25 and 26) and a small height cylinder (27). A cylindrical spacer (28) arranged in the centre between the end plates (26) makes it possible to reduce the bending moment and the thickness of said end plates.

FIG. 5 represents a cross sectional view of the node across the horizontal plane.

FIG. 5 shows the location of connectors (7 and 10) located at the periphery of the large-diameter upper end plate (26). This arrangement allows for the underwater vehicle to have access to the connectors while minimizing the total volume of the cylindrical enclosure.

Figure 6:
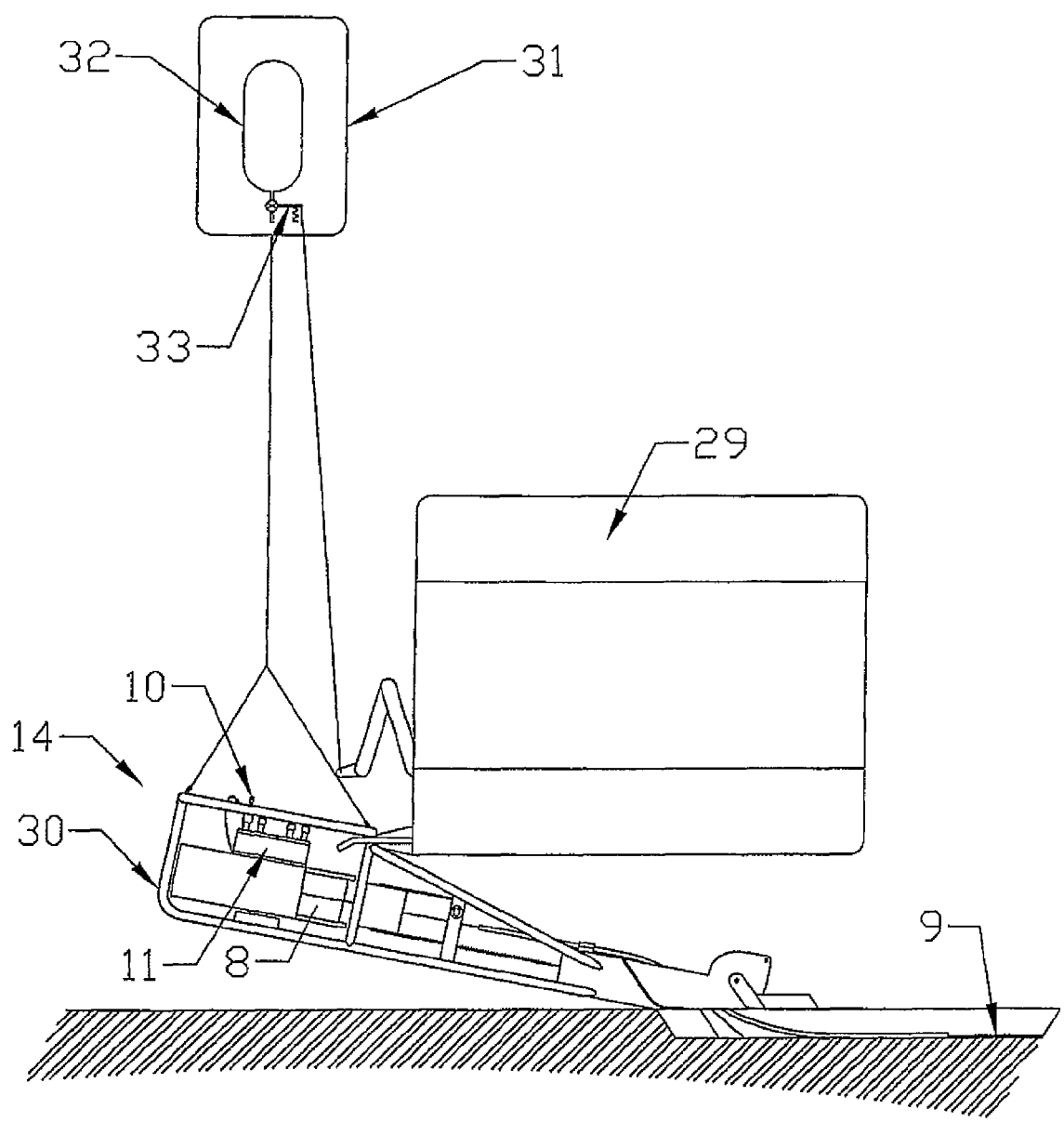
FIG. 6 depicts an overall view of the deployment device.

FIG. 6 represents an overall view of the network's deployment device.

The deployment device (14) of a micro-cable (9) segment of the network, implemented by the underwater vehicle (29) comprises a frame (30), a micro-cable (9) rotary spool (8) fixed on this frame and the node (11) fixed on the spool.

The node (11) fixed on the spool is already connected to one of the ends of the micro-cable (9) segment by means of the connector (10). The node (11) is removable and can be disconnected underwater by means of the underwater vehicle in order to be brought to the surface for maintenance purposes.

The deployment device (14) is borne by a float (31) the buoyancy of which can be adjusted by means of an adjuster (32) filled through a valve (33) actuated by the underwater vehicle (29). This arrangement allows for the underwater vehicle to progressively equilibrate the weight of the assembly in the water while deploying the micro-cable (9) segment according to its limited lifting abilities.

Figure 7:
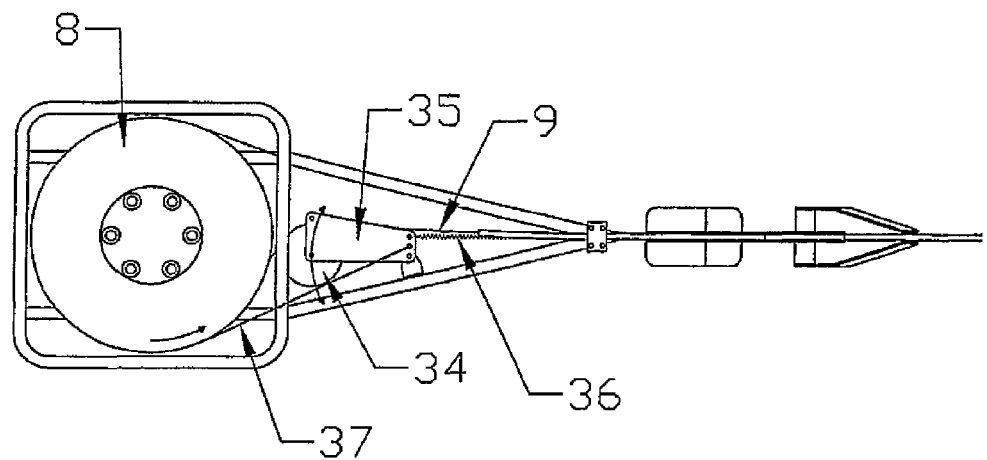
FIG. 7 depicts a detailed view of the tension regulating device of the micro-cable.

FIG. 7 denotes a detailed view of the micro-cable tension regulating device.

A roller (34) mounted on an oscillating arm (35) returned by a spring (36) enables the limiting of tension in the micro-cable (9) (resulting from the spool's inertia) in case of an abrupt acceleration of the underwater vehicle. It also enables the absorption of possible slack of the set micro-cable in admissible tensile conditions.

A stripe brake (37) acting on the spool's (8) periphery is actuated by the oscillating arm (35) when it reaches its stroke end. The purpose of this stripe brake is to prevent slackening in the micro-cable in case of abrupt deceleration of the underwater vehicle.

Figure 8:
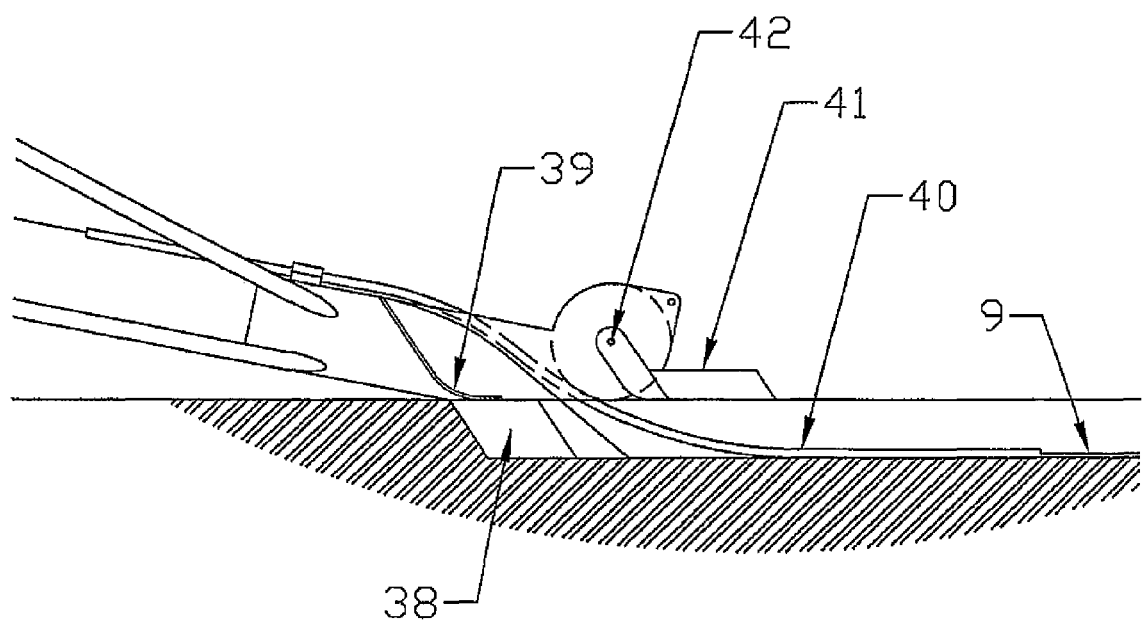
FIG. 8 depicts a detailed view of the micro-cable trenching device.

FIG. 8 depicts a detailed view of the micro-cable trenching device.

In order to better protect the micro-cable (9) from external interferences (vibrations caused by the current, fish bites and other hazards), the network deployment device (14) includes a trenching device for the micro-cable arranged at the output of the deployment device (14).

Preferably, the micro-cable's (9) trenching device consists of a vertical knife (38), and a horizontal pad (39) arranged at the top of the knife (in order to regulate the depth of the trench) and a flexible duct (40) through which passes the micro-cable (9).

A V-shaped scraper blade (41) pivoting on an axis (42) is arranged following the knife (38) in order to partially close the trench made open by means of the knife. With time, the deep sea currents and the sedimentation will terminate the work.

This novel concept should enable the production of particularly cost-effective and easily-extendable deep-sea networks. It may even be possible to proceed with shallow depth points-of-use provided that they are connected on secondary transport segments branched from the main transport segments themselves deployed in deep-sea.

The main embodiment is the production of deep-sea surveillance sensor networks. The term sensor used in the description and claims, without departing from the scope of the invention, relates to any usage of the network on the sea floor under any form whatsoever. It may concern, for example, scientific sensors (current meters, physico-chemical and biological sensors, cameras, located in open waters on the sea floor or in drilled wells). It may also concern civil safety sensors (seismographs, tsunami detectors) or military sensors (underwater earphones, vehicle-positioning sensors).

The invention claimed is:

1. A method for producing a deep-sea network comprising main and secondary transport segments, nodes arranged at points-of-use and local sensors, comprising:
   independently unwinding a plurality of transport segments by unwinding spools of optical micro-cables provided with end connectors and carried by a deployment device implemented on the sea-floor by an underwater vehicle, and
   connecting the ends of the transport segments and local sensors at the sea-floor, using an underwater vehicle, to the nodes formed by stand-alone switches, such that each micro-cable is connected by its end connectors to two successive nodes of the network.

2. The method according to claim 1, wherein the deployment device implemented on the sea-floor by the underwater vehicle, bears both the optical micro-cable spool and the node connected to one of the end connectors.

3. The method according to claim 1, wherein the deployment device implemented by the underwater vehicle is left at the point-of-use.

4. The method according to claim 1, wherein the deployment device implemented by the underwater vehicle bears a spool rotationally locked.

5. The method according to claim 1, wherein the deployment device implemented by the underwater vehicle bears a rotary spool.

6. A deep-sea network obtainable by the method according to claim 1, comprising:
   main and secondary transport segments, wherein the transport segments are independent and are each formed by an optical micro-cable provided with end connectors, local sensors; and
   nodes arranged at the points of use, wherein the nodes are stand-alone switches whereon the ends of the transport segments and the local sensors are connected at the sea floor, each micro-cable being connected by its end connectors to two successive nodes of the network.

7. The deep-sea network according to claim 6, wherein each node is provided with a low-power standby circuit which can wake the network up from node to node upon request from the ground station or one of the local sensors.

8. The deep-sea network according to claim 7, wherein a timer automatically puts each node on standby following wake-up.

9. The deep-sea network according to claim 7, wherein the monitoring circuit, connected to one of the ports of the switch, is able to prevent a local sensor from untimely waking the node, upon request from the ground station.

10. The deep-sea network according to claim 7, wherein the node includes a cylindrical enclosure, of which lower and upper end-plates are of a large diameter and the cylinder has a small height.

11. The deep-sea network according to claim 10, wherein the connectors are located at the periphery of the upper end-plate.

12. A deployment device for the implementation of the method according to claim 5, wherein the device includes a frame, a micro-cable rotary spool fixed on this frame and the node fixed on the rotary spool.

13. The network deployment device according to claim 12, wherein the node is removably fixed.

14. The network deployment device according to claim 12, including a float, the buoyancy of which can be adjusted by means of an adjuster filled through a valve actuated by the underwater vehicle.

15. The deep-sea network deployment device according to claim 12, comprising a micro-cable tension regulating device including a roller mounted on an oscillating arm and returned by a spring.

16. The deep-sea network deployment device according to claim 15, comprising a stripe brake acting on the periphery of the spool, wherein the stripe brake is actuated by the oscillating arm when it reaches its stroke end.

17. The network deployment device according to claim 12, comprising a micro-cable trenching device arranged at the output of the deployment device.

18. The network deployment device according to claim 17, wherein the trenching device including a vertical knife, a horizontal pad arranged at the top of the knife and a flexible duct through which passes the micro-cable.

19. The network deployment device according to claim 18, wherein a V-shaped scraper blade pivoting on an axis is arranged following the knife.

* * * * *